United States Patent
Lanker et al.

(10) Patent No.: US 7,566,353 B2
(45) Date of Patent: Jul. 28, 2009

(54) MODULAR AIR PURIFICATION SYSTEM

(76) Inventors: Noam Lanker, 13b, Shazar st., 22344, Nahariya (IL); Mordechai Rotenberg, 45, HaEgoz st., 44864, Kochav Yair (IL)

( * ) Notice: Subject to any disclaimer, the term of this patent is extended or adjusted under 35 U.S.C. 154(b) by 513 days.

(21) Appl. No.: 11/297,577

(22) Filed: Dec. 8, 2005

(65) Prior Publication Data
US 2007/0131114 A1  Jun. 14, 2007

(51) Int. Cl.
  *B01D 50/00* (2006.01)
(52) U.S. Cl. .............. 55/342; 55/471; 55/482
(58) Field of Classification Search .......... 55/342, 55/385.2, 471, 482, 484
See application file for complete search history.

(56) References Cited
U.S. PATENT DOCUMENTS 6,466,737 B1 * 10/2002 Birdsell et al. .............. 392/367
6,979,359 B2 * 12/2005 Laiti ........................... 55/356

* cited by examiner

*Primary Examiner*—Robert A Hopkins
(74) *Attorney, Agent, or Firm*—Angenehm Law Firm; N Paul Friederichs

(57) ABSTRACT

The invention discloses a modular air purification system comprising a basic purification unit having an inlet and an outlet wherein the basic purification unit comprises a motor, a fan actuated by the motor and a controller. The purification system further comprises at least one enhancing unit adapted to be electrically connected to the basic purification unit or to another enhancing unit in which a plurality of filters are provided. Air that passes through the purification system passes through said the filters. The purification system further comprises at least one voltage connection plugs adapted to electrically connect the basic purification system to the enhancing unit. The enhancing units are adapted to be connected to the basic purification unit in a fully modular manner.

13 Claims, 11 Drawing Sheets

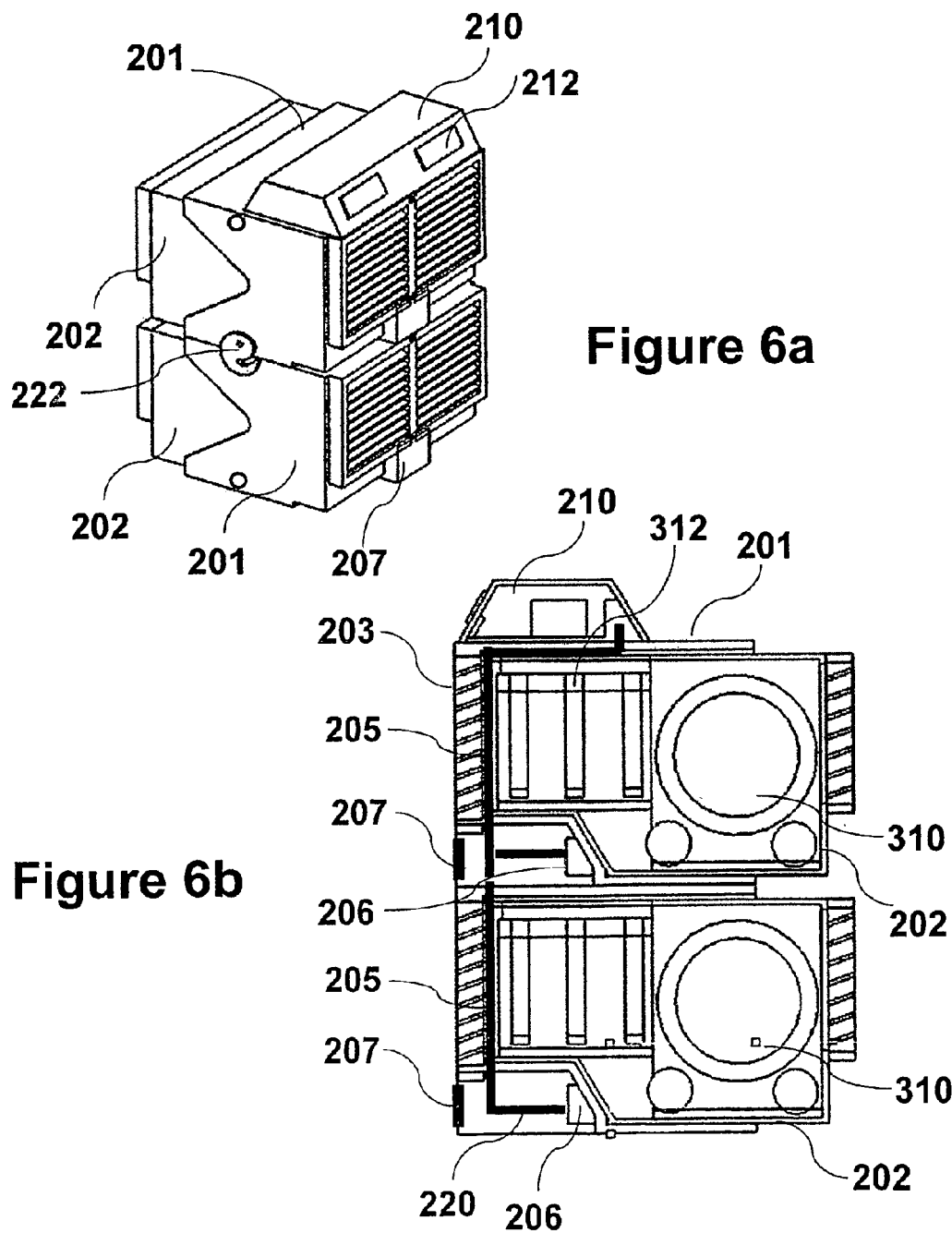

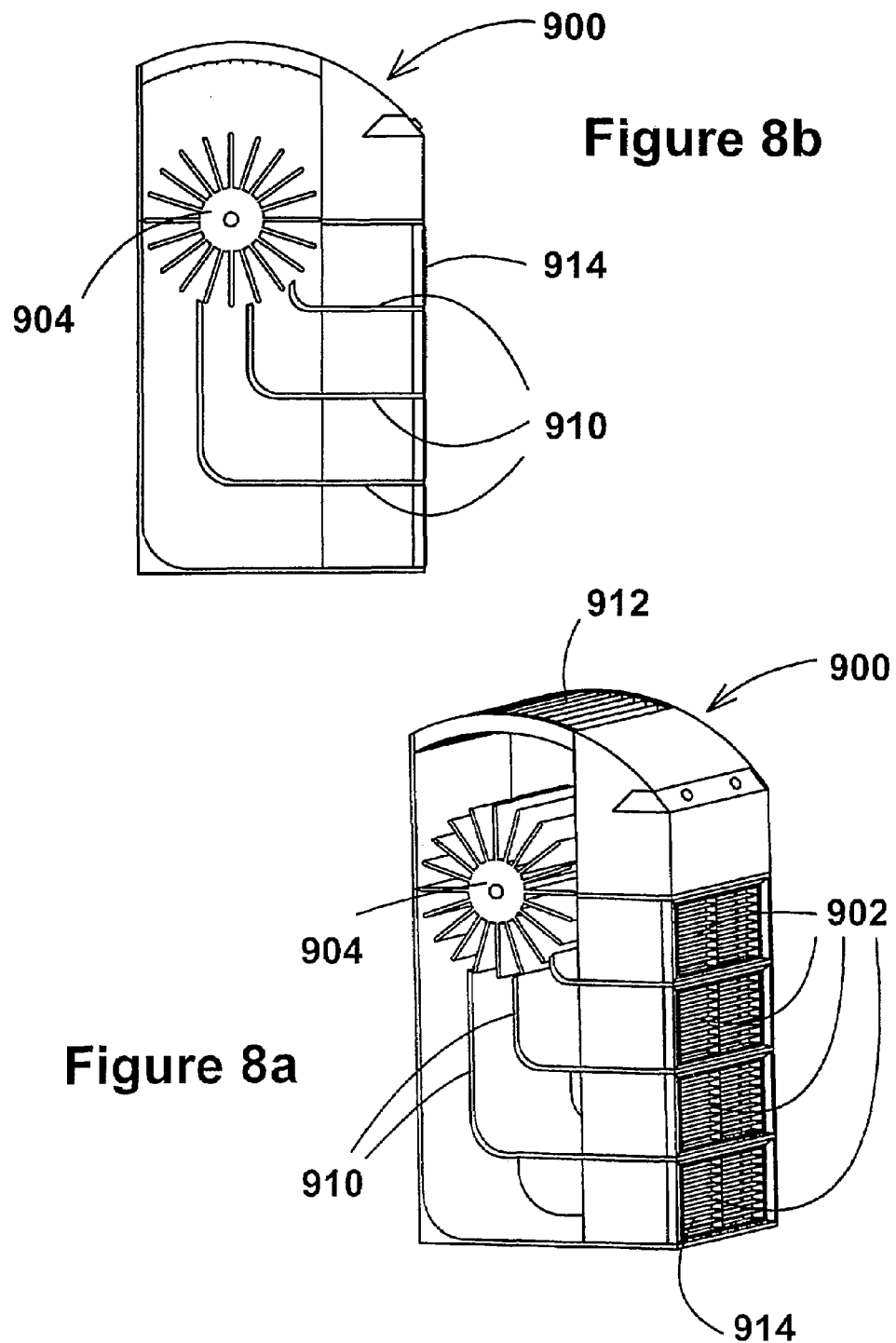

MODULAR AIR PURIFICATION SYSTEM

The present invention claims priority from PCT application serial no. PCT/IL2004/000484 filed on Jun. 9, 2004 which claims priority from U.S. provisional patent application Ser. No. 60/477,095 filed on Jun. 9, 2003. The present invention relates to air purification systems. More particularly, the present invention relates to a modular air purification system having versatility with regard to function, position, and productivity.

FIELD OF THE INVENTION

Background of the Invention

Air purification systems are known in the art. Modular air purification systems are less known although the air quality is varying from time to time.

The quality of air in rooms is affected of factors within the room itself such as people smoking in the room or cloths made of certain fabrics in the room and of factors outside the room such as polluting factories in the area. The pollutants in a closed space such as a room vary from time to time due to changes in the room itself or changes in the environment outside the space.

Therefore, there is a need for purification systems that are versatile; hence modular system of which the filter types can be easily changed, enhanced, or reduced according to the quality of air in the space.

As mentioned herein before, there are known modular purifications systems. An example is disclosed in U.S. Pat. No. 6,001,145 "Air purification apparatus" by Hammes. This air purification system comprises a suction part, a ventilator housing with one or several ventilators and one or more filters disposed before or after the ventilators. Another example disclosed as U.S. Pat. No. 5,034,033 "Modular electronic air cleaning device" teaches a cleaning device comprised of modular subassemblies. U.S. Pat. No. 5,223,008 "Horizontally mounted filter cartridge dust collector" by Troxell teaches a cartridge dust collector that includes a housing and a plurality o filter cartridges horizontally mounted in rows in a cartridge cradle.

However, there are no available systems in which the purification system can accord specific environmental needs that can change in time without major modifications of the system. Moreover, there is no available system that can accord any physical requirements of the space it is positioned in; hence ceiling positioning, floor positioning, corners, walls, supporting pillar, etc.

SUMMARY OF THE INVENTION

It is an object of the present invention to provide a modular air purification system in which purification units can be easily changed or extended according to the specific needs and conditions in the space to be purified.

It is another object of the present invention to provide a modular air purification system in which the modular units that are no longer needed since environmental conditions in the space had been changed, for example, can be withdrawn without dismantling the system.

It is yet another object of the present invention to provide a modular air purification system having a central electricity unit that can provide voltage to the specific purification system in a modular manner.

It is therefore provided in accordance with a preferred embodiment of the present invention A modular air purification system comprising: a basic purification unit having an inlet and an outlet, said basic purification unit comprising: a motor; a fan actuated by said motor; a controller; at least one enhancing unit adapted to be electrically connected to said basic purification unit or to another enhancing unit; at least one of a plurality of filters wherein air passing through said purification system passes through said at least one of a plurality of filters and wherein at least one of said plurality of filters is provided in said basic purification unit; at least one voltage connection plugs adapted to electrically connect said basic purification system to said at least one enhancing unit; whereby a plurality of enhancing units are adapted to be connected to said basic purification unit and wherein air circulates through the purification system due to the rotation of the fan that force air to pass through said at least one of said plurality of filters.

Furthermore, in accordance with another preferred embodiment f the present invention, said modular system further comprises at least one air diverting unit.

Furthermore, in accordance with another preferred embodiment f the present invention, said at least one enhancing units can be connected to said basic purification unit in an aligned manner.

Furthermore, in accordance with another preferred embodiment f the present invention, said at least one enhancing units can be connected to said basic purification unit as well as other enhancing units with a predetermined angle between the units.

Furthermore, in accordance with another preferred embodiment f the present invention, said at least one enhancing units can be connected to the basic purification unit as well as to other enhancing units by a hinge so as to adjust the angle between the units.

Furthermore, in accordance with another preferred embodiment f the present invention, said at least one of a plurality of filters is selected from a group of filters such as UV lamp, electrostatic filter, mosquito killer, scent box, active coal, coarse filter, ionic discharger.

Furthermore, in accordance with another preferred embodiment f the present invention, said basic purification unit is provided with a a plurality of contacts adapted to receive at least one of said plurality of filters that are operates with an electricity support.

Furthermore, in accordance with another preferred embodiment f the present invention, said enhancing unit is provided with a a plurality of contacts adapted to receive at least one of said plurality of filters that are operates with an electricity support.

Furthermore, in accordance with another preferred embodiment f the present invention, data exchanging plugs are provided so as to allow data communication between the enhancing units and the basic purification unit.

Furthermore, in accordance with another preferred embodiment f the present invention, said basic purification system as well as said at least one enhancing unit is provided with a cabinet adapted to receive said plurality of filters.

Furthermore, in accordance with another preferred embodiment f the present invention, each one of said at least one voltage connection plugs is exposed is at least one side of said basic purification unit and said enhancing unit.

Furthermore, in accordance with another preferred embodiment f the present invention, each one of said at least one voltage connection is connected to a main plug through a voltage guide.

Furthermore, in accordance with another preferred embodiment f the present invention, safety switches are provided in any side of said basic purification unit as well as at least one enhancing units where the units are adapted to be connected.

In accordance with yet another preferred embodiment of the present invention, it is provided a modular air purification system comprising: a supporting unit having an inlet and an outlet, said supporting unit comprising: a motor; a fan actuated by said motor; a controller; at least one enhancing unit electrically connected to said basic purification unit; at least one of a plurality of filters provided within said at least one enhancing unit, wherein air passing through said purification system passes through said at least one of a plurality of filters; a fan provided in each of said at least one enhancing units; at least one voltage connection plugs adapted to electrically connect said supporting unit to said at least one enhancing unit; whereby a plurality of enhancing units are adapted to be connected to said supporting unit and wherein air circulates through the purification system due to the rotation of the fans.

BRIEF DESCRIPTION OF THE FIGURES

In order to better understand the present invention and appreciate its practical applications, the following Figures are attached and references herein. Like components are denoted by like reference numerals.

It should be noted that the figures are given as examples and preferred embodiments only and in no way limit the scope of the present invention as defined in the appending Description and Claims.

FIGS. 6a-e illustrate modular purification systems in accordance with other preferred embodiments of the present invention.

FIGS. 8a-c illustrate modular purification system in accordance with yet another preferred embodiment of the present invention, housed in a floor housing.

DETAILED DESCRIPTION OF THE INVENTION AND THE FIGURES

The present invention provides a modular air purification system adapted to purify the air in spaces. The modularity of the system is in several aspects.

In the first aspect, the modularity is physical so as to allow arranging the system in every place in a room in accordance with specific limitations or conditions in the room. For example, in large spaces, several basic purification units may be connected to each other in one packaging while the number of units is versatile. The system can be suspended of the ceiling or put on the floor, again according to specific conditions of the space. In another aspect, the purification units are versatile since different filters or air improvers can be placed within a specific purification unit in a simple manner. The versatility is also pronounced in the productivity of the purification system.

Each system is provided with a main controller and electricity unit while the voltage is transferred through the modular purification units also in a modular manner.

In accordance with one aspect of the present invention, the modular air purification system comprises a basic purification unit having an inlet and an outlet, a motor, a fan actuated by the motor, a control panel adapted for controlling the motor, at least one voltage provider plug and at least one filter.

The modular air purification system further comprises at least one enhancing unit housed in a housing that can be connected to the basic purification unit.

Each one of the enhancing units comprises at least one filter.

In accordance with another aspect of the present invention, the modular air purification system comprises a basic supporting unit having an inlet and an outlet, a motor, a control panel adapted for controlling the motor, and at least one voltage provider plug. The modular air purification system further comprises at least one enhancing unit housed in a housing that can be connected to the basic supporting unit. Each one of the enhancing units comprises at least one filter and a fan actuated by the motor.

In any of the aspects of the present invention, the enhancing units can be arranged in groups and housed so as to be electrically supported by a basic purification unit or a supporting unit, respectively.

Generally, the purification system of the present invention comprises basic purification units or supporting units as well as enhancing units, angle adjusting means, air divergence units, different types of outer housings and other parts. The purification system in accordance with a preferred embodiment of the present invention can comprise any of the units arranged according to the physical and environmental conditions in the space to be purified. In this text, the expressions "filter" or "environment improver" are alternately used and refer to units or elements that are used in order to change the physical conditions of the space. Examples for filters will be given herein after.

Figure 1:
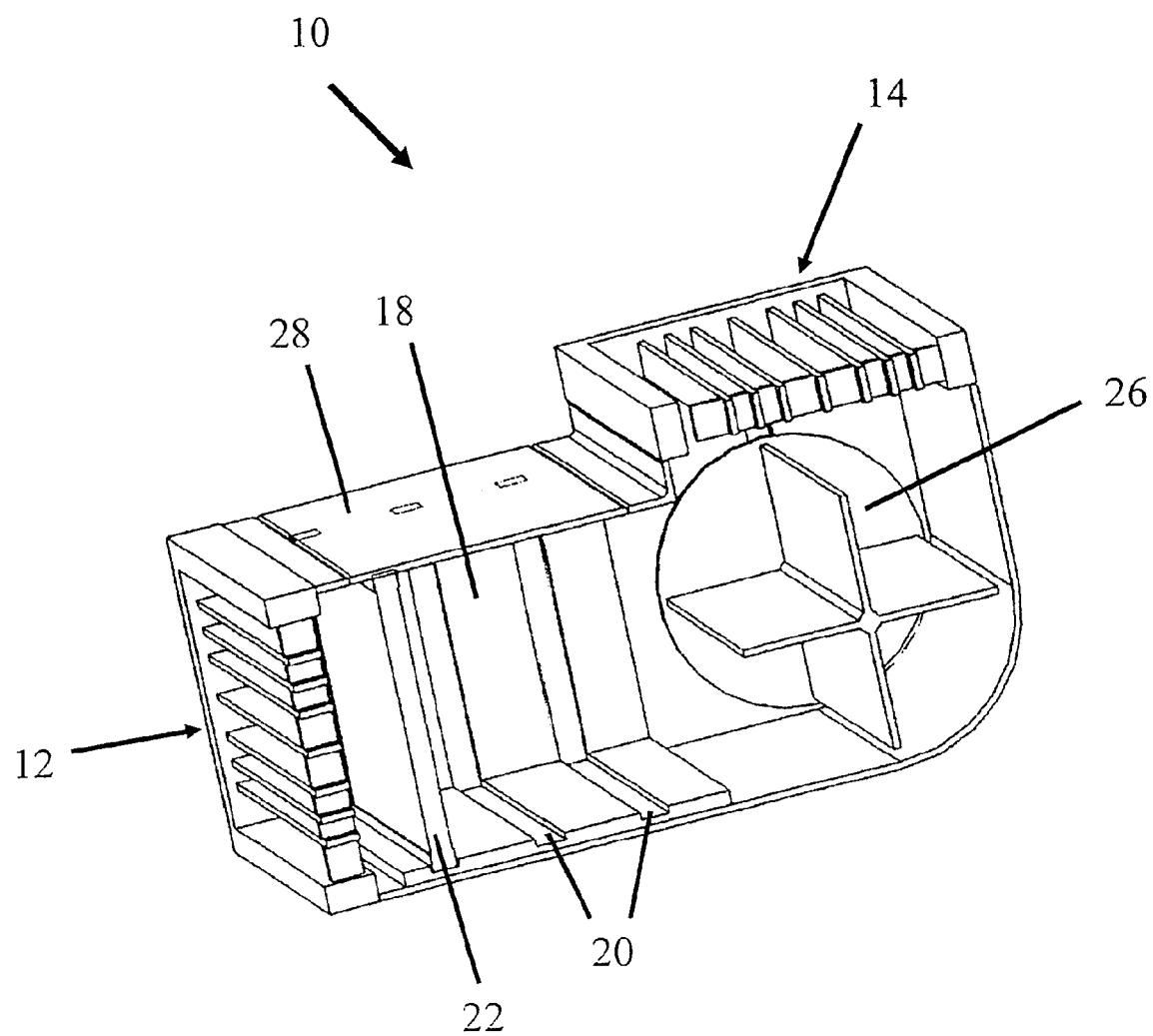
FIG. 1 illustrates a cross sectional view of a basic modular air purification system in accordance with a preferred embodiment of the present invention.

Reference is now made to FIG. 1 illustrating a cross sectional view of a basic modular air purification system in accordance with a preferred embodiment of the present invention. A basic purification unit 10 comprises two louvered ports; an air inlet port 12 and an air outlet port 14, both provided with grille 16. Basic purification unit 10 is provided with a cabinet 18 adapted to receive filtration units wherein the filtering units correspond to the specific conditions in the environment. Cabinet 18 is covered by a cover 28 and is provided with grooves 20 into which at least one filtration unit 22 is inserted. A motor (cannot be seen in FIG. 1) is provided so as to drive an air circulating fan 26. The air circulated through basic purification unit 10 pass through filtration unit 22 so as to produce purified air that exits the unit through air outlet port 14.

As mentioned herein before, the purification units are modular and can be provided with filtration units that accord the conditions that affect the air in the space where the system works.

Figure 2:
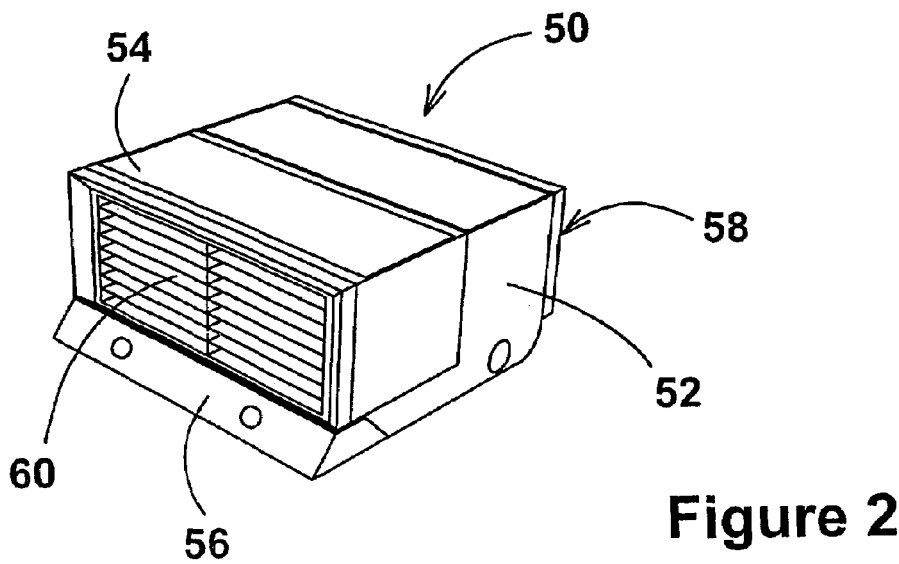
FIG. 2 illustrates an isometric view of a basic modular air purification system in accordance with another preferred embodiment of the present invention.

Reference is now made to FIG. 2 illustrating an isometric view of a basic modular air purification system in accordance with another preferred embodiment of the present invention. Modular air purification system 50 comprises a basic supporting unit 52 supporting an enhancing unit 54.

Supporting unit 52 is provided with electricity support, control panel 56, and a fan that is adapted to circulate air coming through inlet 58 and exit through outlet 60. The inner parts are shown in an exploded view in FIG. 4. A grille is provided in outlet 60 and another grille in the inlet. The inlet can be positioned in the rear side of supporting unit 52 such as in embodiment 50 or in the upper side of the supporting unit such as will be shown in FIG. 3.

Figure 3:
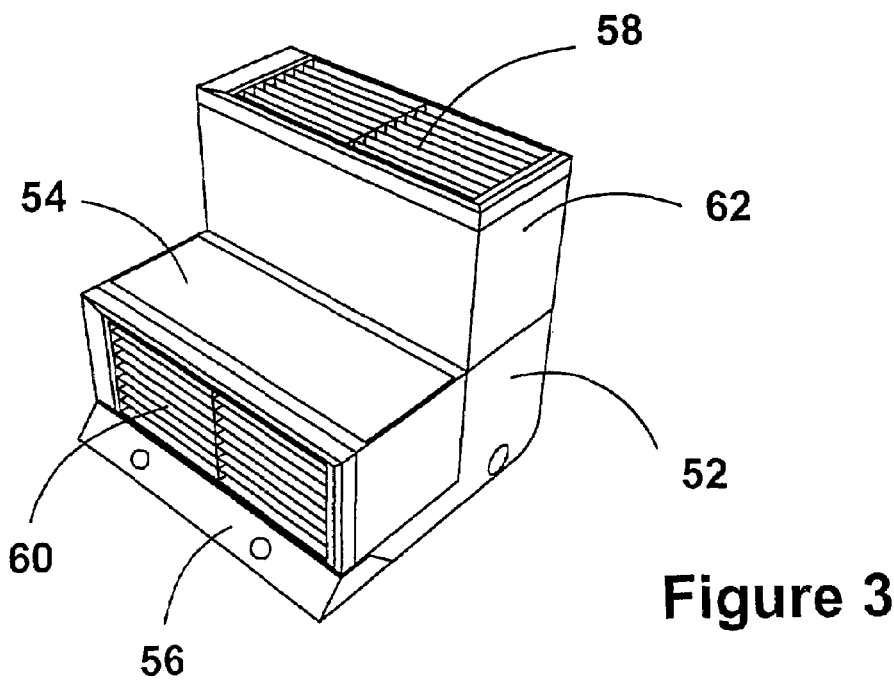
FIG. 3 illustrates an isometric view of the basic modular air purification system shown in FIG. 2, enhanced by enhancing purification unit in accordance with a preferred embodiment of the present invention.

Reference is now made to FIG. 3 illustrating an isometric view of the basic modular air purification system shown in FIG. 2, enhanced by enhancing purification unit in accordance with a preferred embodiment of the present invention. An additional enhancing unit 62 is provided in the upper portion of supporting unit 52 wherein the outlet as shown in FIG. 2 is covered. The air that passes through both enhancing units 54 and 62 as well as through supporting unit 52 is diverted in 90 degrees so as to establish a circulation in the room. The same filtering units can be provided in both enhancing units, however, different filtration units can be employed.

Figure 4:
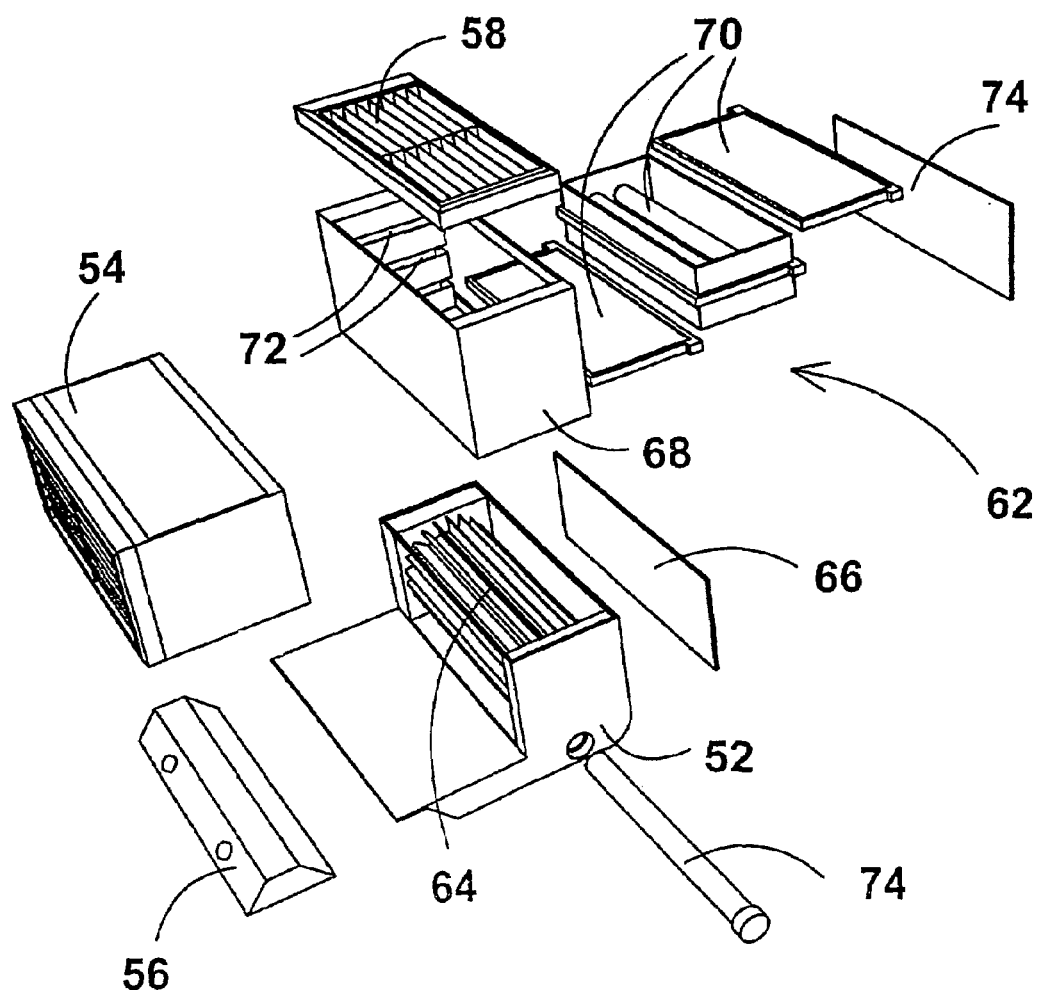
FIG. 4 illustrates a partially exploded view of the system shown in FIG. 3.

Reference is now made to FIG. 4 illustrating a partially exploded view of the system shown in FIG. 3. Supporting unit 52 is provided with a fan 64 that circulates the air and a control panel 56. Control panel 56 is adapted to supply voltage to the whole system without any consideration of the amount of enhancing units that may be connected to the supporting unit. The modular voltage transfer between the units will be elaborated herein after. A cover 66 is provided in supporting unit 52 that covers the rear outlet. The upper portion of supporting unit 52 is open so as to allow the connection of enhancing unit 62 that comprises a cabinet 68 and several air improvers or filters 70. Cabinet 68 is provided with several slots 72 adapted to receive the filters. An additional cover 74 is provided so as to allow access to cabinet 68 in order to change or clean air improvers 70. Smell stick 74 is optionally provided in supporting unit 52 so as to spread pleasant smell in the purified space.

Enhancing units 54 and 62 are units that are solely for filtration wherein the air passively passes through them. The air is circulated by fan 64 that is positioned in the supporting unit. Other active purification units can be also provided wherein an independent fan is provided.

Figures 5A, 5B:
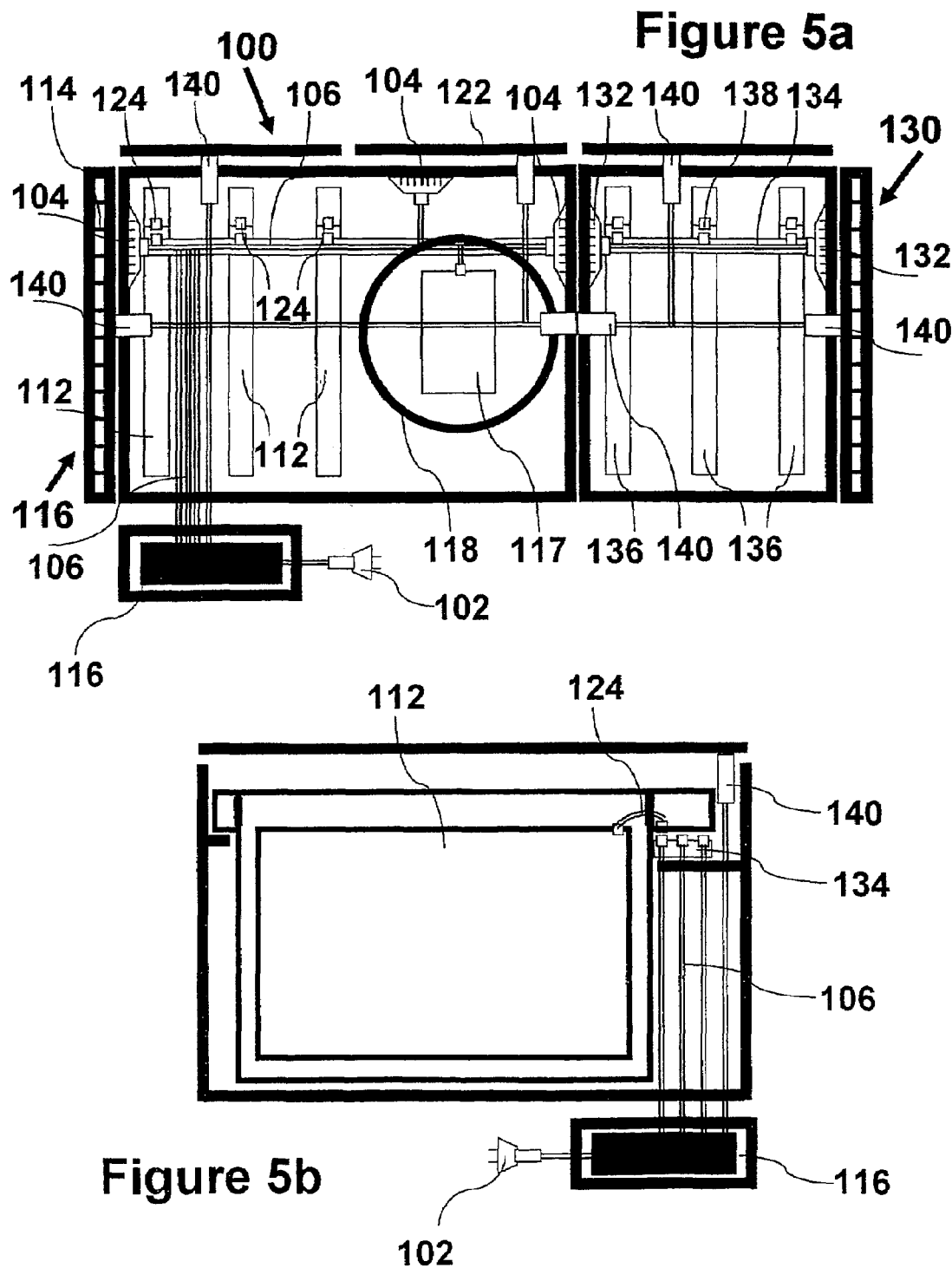
FIGS. 5a-b illustrate schematic representations of longitudinal and lateral cross sectional views of a modular basic purification unit enhanced by enhancing unit in accordance with yet another preferred embodiment of the present invention.

Reference is now made to FIGS. 5a-b illustrating schematic representation of longitudinal and lateral cross sectional views, respectively, of a modular basic purification unit enhanced by enhancing unit in accordance with yet another preferred embodiment of the present invention. FIG. 5a depicts a basic purification unit 100 that is provided with a fan 118 that circulates the air through filters 112 and is actuated using a motor 117. The voltage modularity is shown in FIG. 5. Purification unit 100 is adapted to receive voltage from the voltage mains through a voltage plug 102 that is adapted to receive voltage from any voltage mains: 200V; 1000V; 8000V or any other type. Basic purification unit 100 is provided preferably with three modular voltage plugs 104, each is adapted to be connected to enhancement units, if necessary. Electronic unit 116 electronically communicates voltage plug 102 to modular voltage plugs 104 through voltage guide 124.

Grille 114 is provided on air outlet 116. Air can enter the unit through the rear of purification unit 100 (as shown in the Figure) or enter through the upper side if air direction modification cover 122 is withdrawn and put on the rear inlet.

Voltage guide 106 is provided with electricity contacts 124 along purification unit 100 so that filters 112 that are inserted into positions or other components such as control panel and processor can be electrically connected to the mains and operated through contacts 124. It is optional to provide within purification unit 100 environmental purification and enrichment components, some of which require voltage for operation and some do not. In addition, a motor of air circulating fan 118 is also provided adapted to force air to pass through purification unit 100 and through the purification and enrichment elements so as to filter and enrich the air in the space to be purified. It should be noted that any filter operated in any voltage can be provided in any position or any order other than the order indicated in the example and it will be successfully operated.

Generally, there are filters or air enrichment elements that require electricity in order to work such as UV lamp, electrostatic filter, mosquito killer, or other and there are also filters or air enrichment elements that do not require electricity and perform only due to the air that passes through them such as scent box, active coal, or coarse filters from different types. The types of filters and environmental enrichment elements that will be used in a specific purification unit depend of the type of air in the space to be purified and the specific requirements. One of the scopes of the present invention is the ability to provide a purification system in which the type of filters can be determined or altered in a simple manner and the arrangement of the filters or air enrichment elements in the positions is fully modular so that any position (grooves 20 in FIG. 1 or slots 72 in FIG. 4) is adapted to receive any filter or enrichment element without consideration of the voltage it receives. Any type of filter, whether electrically operated or not, can be inserted into the positions. This is also fully modular.

As mentioned herein before, preferably three modular voltage plugs 104 are provided in direction through which enhancements units may be connected. In FIG. 5a, an enhancing unit that comprises modular voltage plugs 132 oppositely positioned and electrically communicating through voltage guide 134, while one of them is connected through the rear side to plug 104. Filters 136 are provided in enhancing unit 130 so as to enhance the filtering capacity of basic purification unit 100. Filters 136 can be optionally connected to contacts 138.

Additionally, safety switches 140 are provided also in a modular manner so as to prevent system failure. Safety switches 140 are provided in any direction where cover or enhancing unit or grille is provided-in any direction where the electricity system may be exposed. Safety switches 140, whether in basic purification unit 100 or in enhancing unit 130 are electrically connected to electronic unit 116.

Figure 6C:
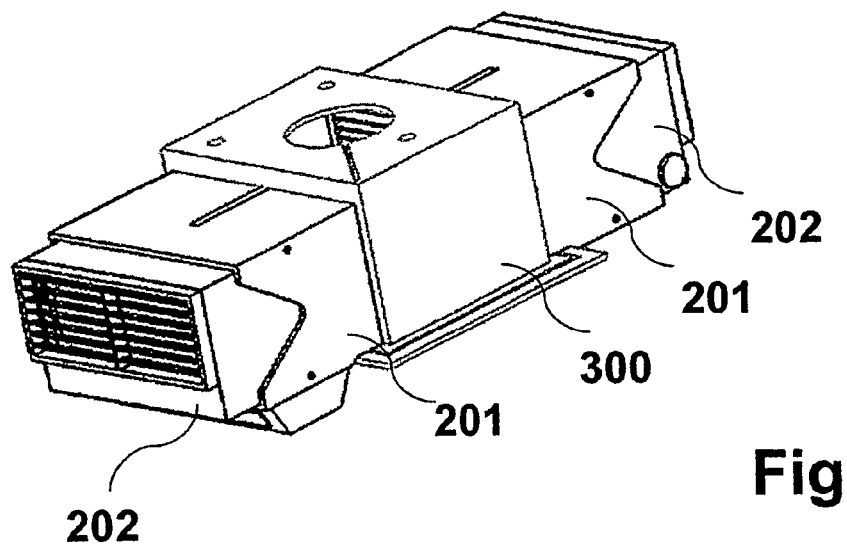
Figure 6D:
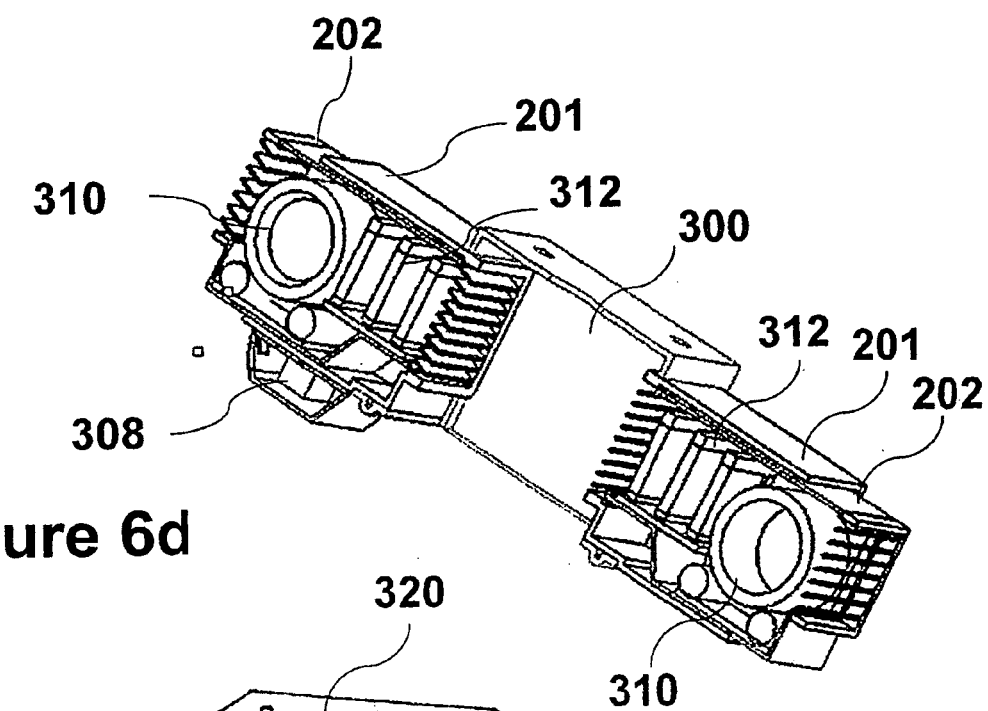

Reference is now made to FIGS. 6a, b, c, d, and e illustrating modular purification systems in accordance with other preferred embodiments of the present invention A floor purification system 200 having two housings 201 with two basic purification units 202 electrically connected and communicating through corresponding voltage and data plugs 206 (the electricity lines are shown clearly in FIG. 6b). Voltage line 220 is electrically communicating with an electronic unit 210 that is provided with a control panel 212. Electronic unit 210 and control panel 212 are electrically communicating with each one of voltage plugs 204 of purification units 202 through voltage wires passing through voltage line 220. Similarly, communication lines communicate between purification units 202 and the control panel through corresponding data plugs and voltage guide line 205. The voltage plugs are connected in a mail-female manner. The user can easily detach a purification unit so as to change the air improvers within the purification units, maintenance or for any other purpose. In a similar manner, one can modify the filters if the conditions in the space are changed as well as add additional enhancing units if there is a need. As can be seen in FIG. 6a, floor housings are connected with a fast connector 222. Additional housings can be connected with additional purification units that are plugged to the system in an easy manner. An integral grille 203 is provided in the outlets and the inlets of the units (basic or enhanced). Voltage connection or exits are covered by coves 207. FIGS. 6c and d illustrate a modular purification system in accordance with other preferred embodiments, housed in a ceiling housing. A ceiling housing 300 is suspended of the ceiling wherein as many purification units can be employed within individual housings and wherein in the Figures a basic purification unit 202 and another basic purification unit 202 are oppositely connected to ceiling housing 300. One of purification units 202 is a basic unit provided with electronic unit 308. Electronic unit 308 is electronically connected and communicating with the other purification unit that acts as an enhancing unit. Purification units 202 are housed within housing 201 (similar to the floor housing) and is provided with a fan 310 adapted to circulate the air through filters 312.

Figure 6E:
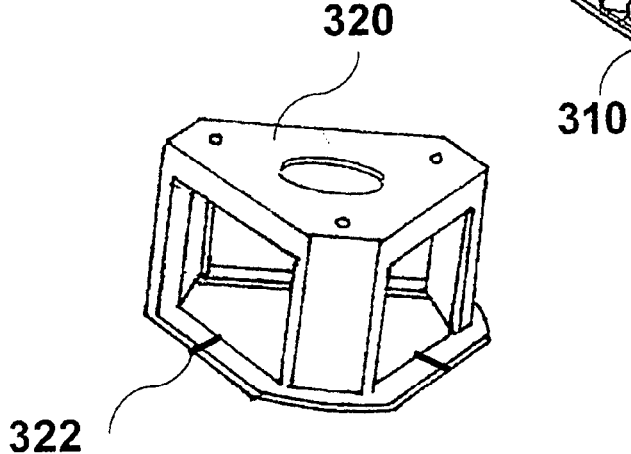

Ceiling housing can be designed to accommodate any number of purification units. As an example, one can see in FIG. 6e a ceiling housing 320 adapted to accommodate three housings such as housings 201 and three purification units such as purification unit 202. Ceiling housing 320 is provided with voltage transmission channels adapted to transmit voltage through the main unit to the other purification units.

Figure 7A:
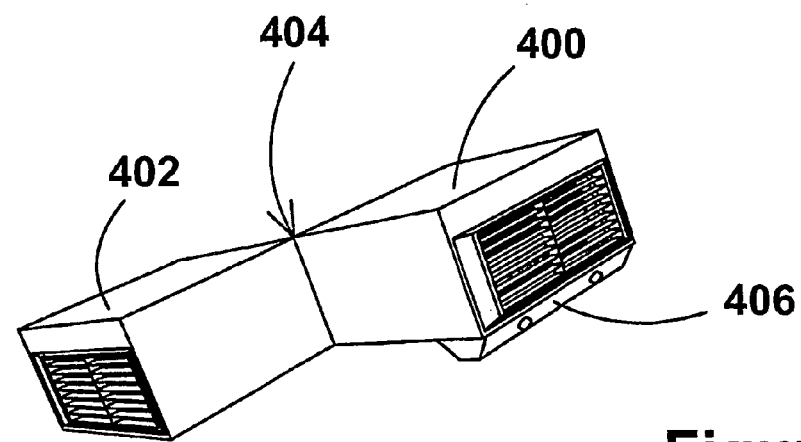
FIGS. 7a-f illustrate modular arrangements of air purification system in accordance with different embodiments of the present invention, adapted for suspending of ceiling or attached to a wall.

Reference is now made to FIGS. 7a-f illustrating modular arrangements of air purification system in accordance with different embodiments of the present invention, adapted for suspending of ceiling or attached to a wall. It is possible to modular arrange the purification units into an air purification system according to the physical conditions in the space to be purified. FIG. 7a illustrates a two units ceiling arrangement wherein both units can be arranged in a different arrangement. Purification unit 400 provided with a controller and an operation panel 406 is connected to an enhancing unit 402 through a hinge 404 about which the units can be rotated. The units can be closed together or in an angle between them such as shown in FIG. 7a.

Figure 7B:
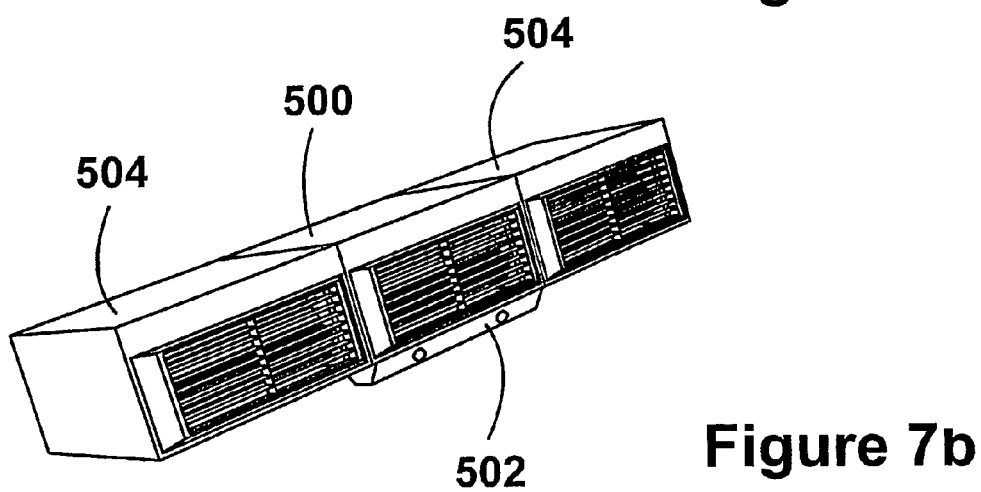
Figure 7C:
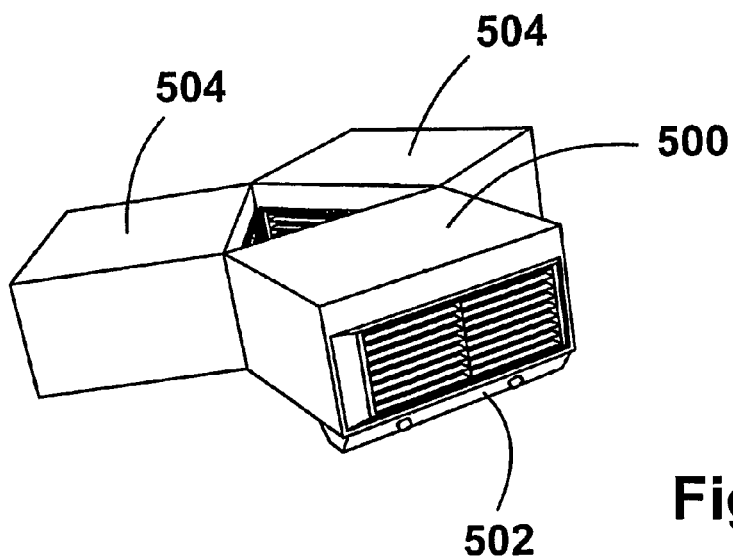

FIG. 7b illustrates a three units system-purification unit 500 provided with a controller and a control panel 502 and two enhancing units 504 on both sides of the purification unit. The units are adjacent to each other on one side so as to establish an arrangement that can be suspended of the ceiling or hanged on a wall. FIG. 7c illustrates a triangular arrangement of the same three-units system. FIG. 7d illustrates a sis units purification system 600 comprising two units each comprising a main purification unit and two enhancing units. In this case, each three units system can be operated independently; however this arrangement can be also built of six units comprising a purification unit connected to five enhancing units.

Figure 7F:
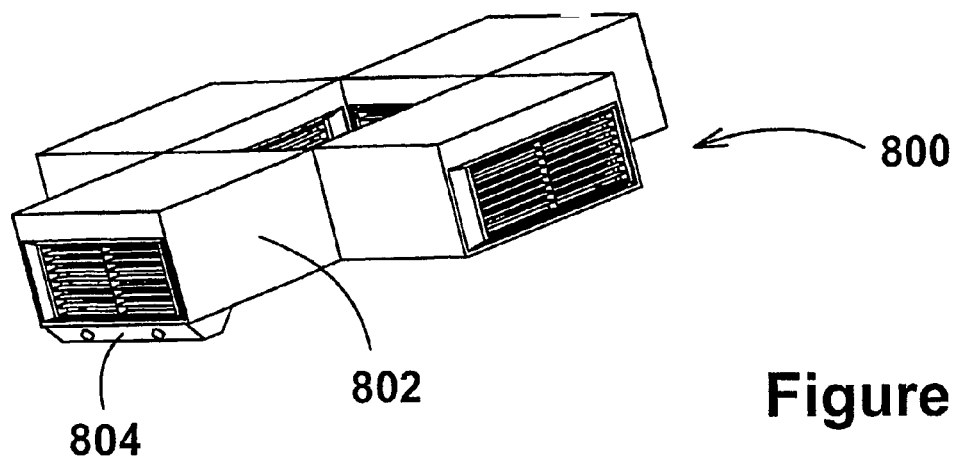
Figure 7E:
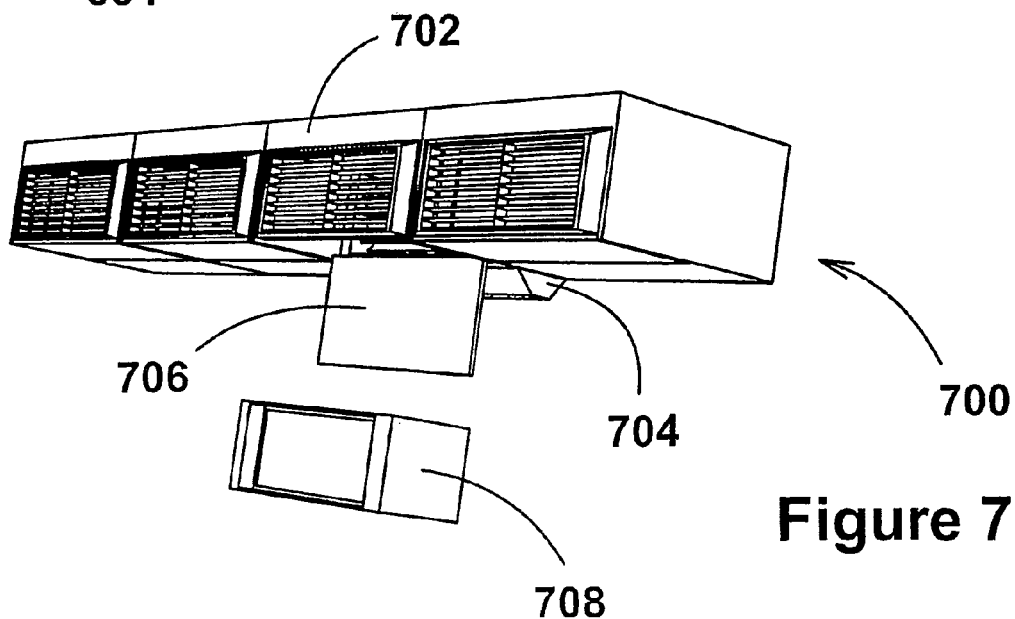
Figure 7D:
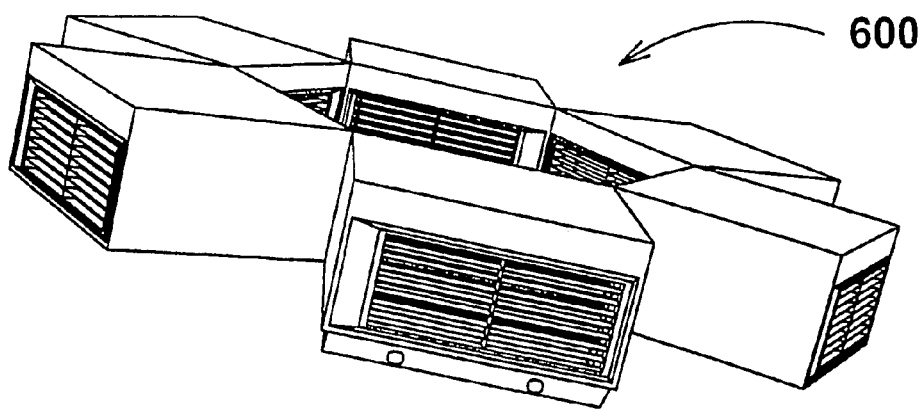

FIGS. 7e and 7f illustrates a purification system arranged of four units in a row 700 and in a square 800, respectively. Only one purification unit 702 and 802, respectively, is provided with controller and controlling panel 704 and 804, respectively. Each unit is provided with a door 706 in the bottom of the unit through which a cabinet 708 with the filters can be removed for maintenance or treatment.

In all units shown in FIG. 7, the units are partially independent and having their own fan (cannot be seen in the Figures).

Figure 8C:
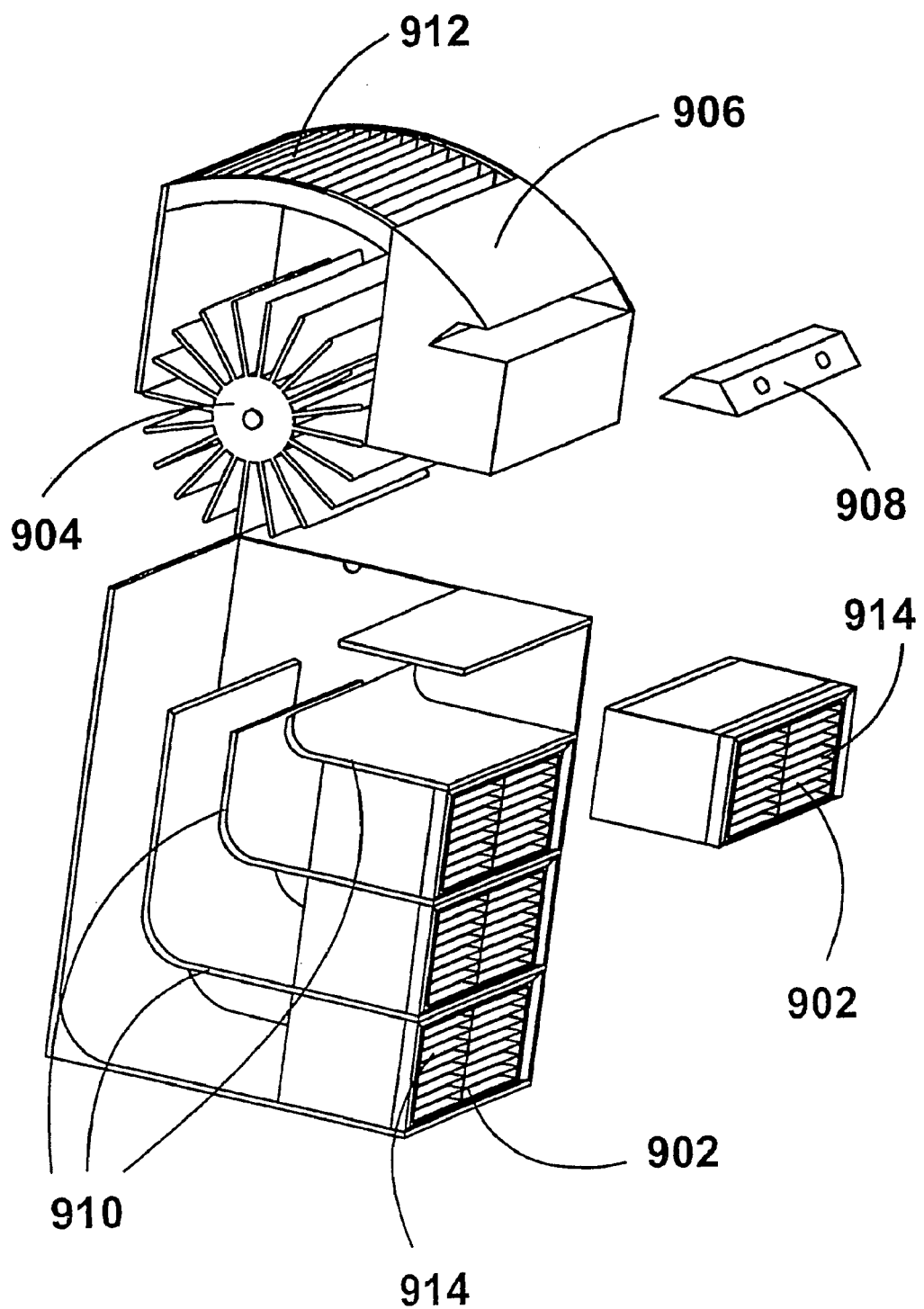

Reference is now made to FIGS. 8a, b and c illustrating modular purification system in accordance with yet another preferred embodiment of the present invention, housed in a floor housing. In the floor housing shown as purification system 900, four enhancing units 902 are getting circulation of air from a single fan 904 that serves all units. Enhancing units are similar to the units that are shown in FIGS. 2 and 3 wherein only filters are provided within the cabinets in the units. A supporting unit 806 (clearly shown in FIG. 8c which is an exploded view of the purification system) is provided with fan 904 that supports all four enhancing units as well as a controller 908. Controller 908 supports the voltage of all four enhancing units as explained herein before, in a modular manner. Dividers direct the air coming through inlet port 912 to pass through all four enhancing units 902 so as to purify all the air in the space. The air exits through the grilled outlet ports 914 purified.

Figure 9:
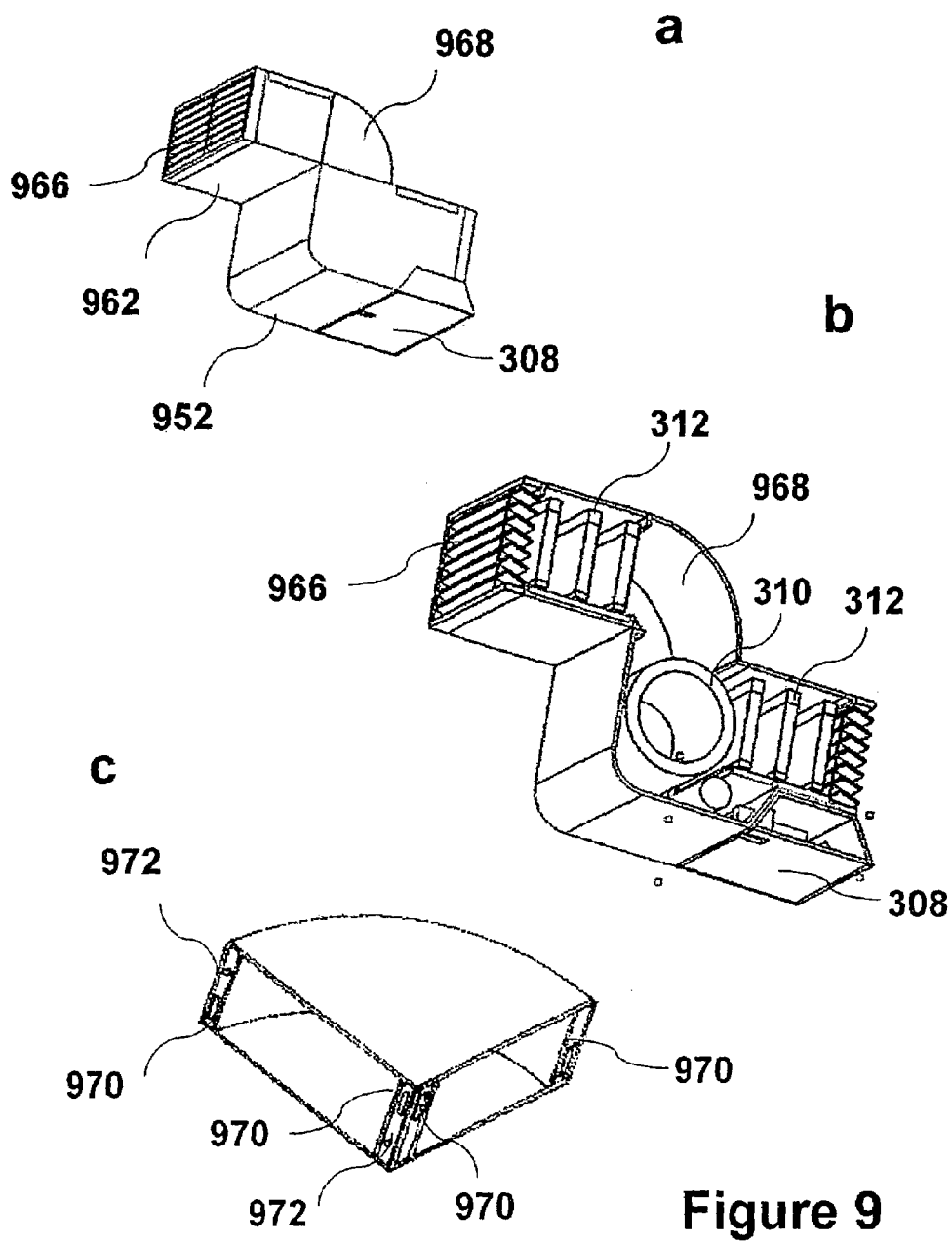
FIGS. 9a-c illustrate an arrangement of the modular purification system in accordance with another preferred embodiment of the present invention.

Reference is now made to FIG. 9a-c illustrating an arrangement of the modular purification system in accordance with another preferred embodiment of the present invention. As mentioned herein before, the modular system is adapted to allow positioning the purification system in any place within the space in regard with different physical limitations. An example of a step-wise arrangement is shown in Purification system 950. An isometric view is shown in FIG. 9a and a cross sectional corresponding view is shown in FIG. 9b.

Purification system 950 comprises a basic purification unit 952 that includes a fan 954, filters 956 and a controller 958. The controller is adapted to control the system including as many enhancing units as needed. A grilled port 960 is provided on the side of basic unit 952. An enhancing unit 962 is provided also with filters 964 and grilled port 966.

Due to positioning limitations, the enhancing unit has to be connected in a step-wise positioning relative to the basic unit. For that reason, a diverting unit 968 is provided to divert the air coming from basic unit 952 into the connected enhancing unit. Voltage is transferred from controller 958 through electricity channels that are provided all through the units are provided also in diverting unit 958. Plugs 970 for transferring voltage through the units are provided on diverting unit 968 as well as corresponding plugs available in the basic unit and the enhancing unit (not shown in the figures). Adjacent to every plug, a safety micro-switch 972 is provided so as to prevent electricity failure.

It should be mentioned that the filters or air improvers can be mounted near the outlet of the system or near the inlet of the system according to the needs of the environment.

It should be emphasized that the purification system can be provided with several enhancing units, all operated through a single controller.

It should be clear that the description of the embodiments and attached Figures set forth in this specification serves only for a better understanding of the invention, without limiting its scope as covered by the following Claims.

It should also be clear that a person skilled in the art, after reading the present specification can make adjustments or amendments to the attached Figures and above described embodiments that would still be covered by the following Claims.

The invention claimed is:

1. A modular air purification system comprising:
at least one basic purification unit having an inlet and an outlet, said basic purification unit comprising:
a motor;
a fan actuated by said motor; and
a controller;
at least one enhancing unit capable of being electrically connected to said at least one basic purification unit or to another enhancing unit;

at least one of a plurality of filters wherein air passing through said purification system passes through said at least one of a plurality of filters and wherein at least one of said plurality of filters is provided in said at least one basic purification unit;

at least one voltage connection plugs adapted to electrically connect said basic purification system to said at least one enhancing unit; and whereby a plurality of enhancing units are adapted to be connected to said at least one basic purification unit and wherein air circulates through the purification system due to the rotation of the fan that force air to pass through said at least one of said plurality of filters.

2. The modular system as claimed in claim 1, wherein said modular system further comprises at least one air diverting unit.

3. The modular system as claimed in claim 1, wherein said at least one enhancing units can be connected to said at least one basic purification unit in an aligned manner.

4. The modular system as claimed in claim 1, wherein said at least one enhancing units can be connected to said at least one basic purification unit as well as other enhancing units with a predetermined angle between the units.

5. The modular system as claimed in claim 1, wherein said at least one enhancing units can be connected to said at least one basic purification unit as well as to other enhancing units by a hinge so as to adjust the angle between the units.

6. The modular system as claimed in claim 1, wherein said at least one of a plurality of filters is selected from a group of filters such as UV lamp, electrostatic filter, mosquito killer, scent box, active coal, coarse filter, ionic discharger.

7. The modular system as claimed in claim 1, wherein said at least one basic purification unit is provided with a plurality of contacts adapted to receive at least one of said plurality of filters that are operates with an electricity support.

8. The modular system as claimed in claim 1, wherein said enhancing unit is provided with a plurality of contacts adapted to receive at least one of said plurality of filters that are operates with an electricity support.

9. The modular system as claimed in claim 1, wherein data exchanging plugs are provided so as to allow data communication between the enhancing unit and said at least one basic purification unit.

10. The modular system as claimed in claim 1, wherein said basic purification system and said at least one enhancing unit are provided with a cabinet capable of receiving said plurality of filters.

11. The modular system as claimed in claim 1, wherein each one of said at least one voltage connection plugs is exposed in at least one side of said at least one basic purification unit and said at least one enhancing unit.

12. The modular system as claimed in claim 1, wherein safety switches are provided in any side of said at least one basic purification unit as well as at least one enhancing unit where the units are adapted to be connected.

13. The modular system as claimed in claim 1, wherein each one of said at least one voltage connection is connected to a main plug through a voltage guide.

* * * * *